United States Patent Office 3,218,205
Patented Nov. 16, 1965

3,218,205
USE OF HYDROGEN HALIDE AND HYDROGEN
IN SEPARATE STREAMS AS CARRIER GASES IN
VAPOR DEPOSITION OF III-V COMPOUNDS
Robert A. Ruehrwein, Clayton, Mo., assignor to
Monsanto Company, a corporation of Delaware
No Drawing. Filed July 13, 1962, Ser. No. 209,740
11 Claims. (Cl. 148—175)

The present invention relates to a method for the production of epitaxial films of large single crystals of inorganic compounds.

More particularly, this invention relates to a method for the production of epitaxial films comprising the nitrides, phosphides, arsenides and antimonides of boron, aluminum, gallium, indium and mixtures thereof. Substrates suitable for these epitaxial films comprise seed crystals of compounds selected from the same class of compounds comprising the epitaxial film, I-VII and II-VI compounds and silicon or germanium.

It is an object of this invention to provide a new and economical method for the production of the above described class of compounds which are characterized as having a crystalline structure and existing as well-defined single crystals.

A still further object of this invention is the formation and deposition of epitaxial films of the above-described materials upon substrates of the same or different materials.

The III-V compounds of the present invention are prepared by interacting two gaseous mixtures comprising as one of them a complex reaction mixture formed by contacting a gaseous hydrogen halide, e.g., hydrogen chloride, hydrogen bromide or hydrogen iodide, with a Group III element at a temperature sufficiently high to react these components. The exact composition of this reaction mixture is unknown, but is believed to consist of hydrogen, unreacted hydrogen halide and various Group III halides such as the mono-, di- and trihalides. The second gaseous mixture is formed by contacting a stream of gaseous hydrogen with a Group V element or a volatile Group V compound at a temperature insufficient to cause reaction with the hydrogen. At this stage of the process the hydrogen serves primarily as a carrier for the Group V element or compound.

The two gaseous mixtures are then intermixed in a reaction tube at a temperature sufficient to deposit the III-V compound as an epitaxial film on a seed crystal substrate situated in the reaction tube. In general, the III-V compound deposits from the complex reaction when the latter is subjected to a lower temperature level. However, an exception to this generality involves the compound boron phosphide, BP, which deposits when the reaction mixture is subjected to a still higher temperature level than that of the boron reservoir.

The temperature used in carrying out the reaction between the above described III-B component-hydrogen halide reaction mixture and the V-B component-hydrogen mixture will generally be above about 135° C. to as much as 1500° C., a preferred operating range being from 400° C. to 1300° C. Still more preferred ranges of temperatures for making individual products constituting species within the generic temperature range are:

| | ° C. |
|---|---|
| BP | 700–1200 |
| InP | 500–1000 |
| GaP | 700–1200 |
| GaAs | 600–1200 |
| InAs | 500–900 |
| AlP | 500–1000 |
| AlAs | 700–1200 |
| InSb | 400–500 |
| GaSb | 500–650 |
| AlSb | 700–1000 |
| BN | 800–1200 |
| AlN | 600–1200 |

The only temperature requirements are that the temperatures of the tubes leading from the III-B and V-B reservoirs be no lower than the temperature of the respective reservoirs. For the III-B elements the reservoir temperature is usually within the range of from 135°–1500° C. and for the V-B element or compound, from —100 to 600° C. The time required for the reaction is dependent upon the temperature and the degree of mixing and reacting. The hydrogen halide-III-B and hydrogen-V-B gaseous components may be introduced individually through nozzles, or may be premixed as desired.

In conducting the vapor phase reaction between the Group III-B reaction mixture and the Group V-B-hydrogen mixture for the production of a crystalline solid III-B—V-B compound, it is essential that gaseous hydrogen be present in the system when the Group V-B component is a halide, and that oxidizing gases be excluded.

The Group V-B starting materials include elemental nitrogen, phosphorus, arsenic and antimony and volatile compounds thereof, such as the corresponding halides, hydrides and alkyl compounds. Preferred compounds are the halides, e.g., the chlorides, bromide and iodides of the above elements.

The apparatus employed in carrying out the process of the present invention may be any of a number of types. The simplest type constitutes a closed tube of a refractory material such as glass, quartz or a ceramic tube such as mullite into which the crude reactant materials are introduced. The tube is then sealed off and subjected to temperatures within the range of from 135° C. to 1500° C. for a period of from less than one minute to one hour or more, until the reaction is complete.

On a larger scale, the present process is, preferably, operated as continuous flow system. This may constitute a simple reaction tube in which the seed crystal is located and in which hydrogen gas is then passed to flush oxygen from the system. Into this tube are passed the above-described reaction mixtures along the same or one or more additional conduits. The III-V compound formed in the reaction tube deposits as an epitaxial layer on the seed crystal. Various other modifications including horizontal and vertical tubes are also contemplated, and recycle systems in which the exit gas after deposition of the single crystal product is returned to the system is also desirable.

An advantage of the present method for the production of epitaxial films of III-B—V-B compounds is the ease of obtaining high purity products. In contrast to this method, the conventional method for the preparation of III-V compounds beginning with the respective elements from the Group III and Group V series requires a difficult purification technique for the metals. The conventional purification procedures are not as effective when dealing with the metals in contrast to the present invention. For example, the high-temperature vapor-phase reaction employed in the present method inherently introduces another factor favoring the production of pure materials, since the vaporization of the respective Group III and Group V elements or compounds, e.g., the halides, results in a further rejection of impurities. The desired reaction for the production of the III-B—V-B compound occurs between the Group III-B-hydrogen halide reaction mixture, the Group V-B element or compound and hydrogen to yield the III-V compound. As a result, it is found that unusually pure materials which are of utility in various electrical and electronic applications such as in the manufacture of semiconductors are readily obtained.

The most important aspect of this invention is the provision of a means of preparing and depositing epitaxial films of the purified single crystal material onto various substrates. These deposited films permit the fabrication of new electronic devices discussed hereinafter. The characteristic feature of epitaxial film formation is that starting with a given substrate material, e.g., gallium arsenide, having a certain lattice structure and oriented in any direction, a film, layer or overgrowth of the same or different material may be vapor-deposited upon the substrate. The vapor deposit has an orderly atomic lattice and assumes the same lattice structure and geometric configuration of the substrate. When using a certain material, e.g., gallium arsenide, as the substrate and another material, e.g., indium phosphide as the film deposit it is necessary that lattice distances of the deposit material closely approximate those of the substrate in order to obtain an epitaxial film. In this connection it is pointed out that crystal lattice "mismatches" up to about 40% are tolerable. That is, while, preferably, the crystal lattice of the epitaxial film approximate closely that of the seed crystal substrate, still, epitaxial films are successfully prepared when the crystal lattice spacing of the epitaxial film and the substrate differ by up to 40%.

The seed crystal may have any orientation, e.g., the crystallographic plane exposed to the depositing film may have the (100), (110), (111), (112), (113), etc. crystal faces exposed. However, it has been found that superior epitaxial films result when the seed crystal is oriented (100) or (III)B and, preferably, the (100) orientation. The (111)B crystal face is the (111) face having the Group V element exposed, e.g., in GaAs the (111)B face has arsenic atoms exposed. When other crystal orientations are employed, e.g., (110) or (111)A, the epitaxial films deposited on them are operable, but are more likely to be less smooth and uniform in thickness.

A particular advantage of the present method for the production of epitaxial films of III–B—V–B compounds is that in forming the epitaxial layer on the substrate, the substrate is not affected and therefore sharp changes in impurity concentration can be formed. By this method it is possible to prepare sharp and narrow junctions, such as p-n junctions, which cannot be prepared by the conventional methods of diffusing and alloying.

The thickness of the epitaxial film may be controlled as desired and is dependent upon reaction conditions such as temperatures within the reactor, gas flow rates and time of reaction. In general, the formation of large single crystals and thicker layers is favored by higher temperatures as defined above, and larger flow rates.

As stated hereinbefore, the epitaxial films formed in accordance with this invention comprise compounds formed from elements of Groups III–B and V–B of the periodic system. Included in this group of compounds are the nitrides, phosphides, arsenides and antimonides of boron, aluminum, gallium and indium. The bismuthides and thallium compounds, while operable, are less suitable. Preferred compounds within this group include gallium arsenide, gallium phosphide, aluminum arsenide, aluminum phosphide, indium arsenide and indium phosphide. In addition to the use of the above compounds by themselves, mixtures of these compounds are also contemplated as epitaxial films e.g., aluminum nitride and indium antimonide mixed in varying proportions when produced by the instant process produce suitable semiconductor compositions.

Other combinations of elements within the above group which are contemplated herein include ternary and quaternary compositions, or mixed binary crystals, such as combinations having the formulae $GaAs_xP_{1-x}$, $InAs_xP_{1-x}$, $GaP_xN_{1-x}$, $AlP_xAs_{1-x}$, $Ga_xIn_{1-x}As$, $Ga_xIn_{1-x}P$, $In_xGa_{1-x}Sb$, $Ga_xAl_{1-x}P$, $Ga_yIn_{1-y}As_xP_{1-x}$ and $$Ga_xIn_{1-x}P$$

where $x$ and $y$ have a numerical value greater than zero and less than 1.

Materials useful as substrates herein include the same materials used in the epitaxial films as just described, and, in addition, compounds of elements of Groups II and VI (II-VI compounds) and compounds of Groups I and VII elements (I-VII compounds), and elements silicon and germanium are suitable substrates. Suitable dimensions of the seed crystal are 1 mm. thick, 10 mm. wide and 15–20 mm. long, although larger or smaller crystals may be used.

As will be described hereinafter, the materials used herein either as films or substrates or both may be used in a purified state or containing small amounts of foreign materials as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group II of the periodic system, e.g., beryllium, magnesium, zinc, cadmium and mercury are incorporated into the reaction components in order to produce p-type conductivity, and tin or a tin compound such as tin tetrachloride or an element from Group VI, e.g., sulfur, selenium and tellurium, to produce n-type conductivity. These "impurities" are carried over with the reactant materials in the vapor phase and deposited in a uniform dispersion in the epitaxial film of the formed product on the substrate. Since the proportion of dopant deposited with the III–V compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as $SnCl_4$ to the reservoir of the Group III–B and/or V–B components, or the dopant can be added with a separate stream of hydrogen from a separate reservoir.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1 \times 10^{15}$ to $5 \times 10^{20}$ atoms/cc. of product.

Vapor deposits of the purified material having the same conductivity type as the substrate may be utilized to form intrinsic $pp^+$ or $nn^+$ regions.

Variations of the preceding techniques permit the formation of devices having a plurality of layers of epitaxial films each having its own electrical conductivity type and resistivity as controlled by layer thickness and dopant concentration. Since the vapor deposited material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide, is vapor deposited upon a substrate of germanium. Subsequently, a quantity of the same material with different doping agents or different concentrations of the same dopant or another of the described materials, e.g., indium phosphide, may be vapor deposited from starting materials comprising these elements as a second epitaxial film over the epitaxial film of gallium arsenide already deposited on the substrate. This procedure with any desired combination of epitaxial and non-epitaxial layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, the thickness of the film and the impurity concentration are controllable to obtain a variety of electrical effects required for specific purposes, as discussed elsewhere herein.

Various electronic devices to which these epitaxially filmed semiconductors are applicable include diodes (e.g., tunnel diodes), parametric amplifiers, transistors, high frequency mesa transistors, solar cells, thermophotovoltaic cells, components in micromodule circuits, rectifiers, thermoelectric generators, radiation detectors, optical filters, watt-meters and other semiconductor devices.

The invention will be more fully understood with reference to the following illustrative specific embodiments:

Example 1

This example illustrates the formation and deposition of an epitaxial film of p-type GaAs on n-type GaAs as the substrate.

A polished seed crystal of n-type GaAs weighing 2.88 g. and containing $5.8 \times 10^{18}$ carriers/cc. of tellurium dispersed therein is placed in a fused silica reaction tube located in a furnace. The GaAs seed crystal is placed in a silica support inside said tube. The reaction tube is heated to 700° C. and a stream of hydrogen is directed through the tube for 15 minutes to remove oxygen from the surface of the GaAs.

A stream of hydrogen chloride is then directed through a reservoir of elemental gallium maintained at about 800° C. thus reacting and vaporizing with the gallium, which gaseous reaction product is then conducted through a heated tube from the reservoir to the reaction tube containing the GaAs seed crystal.

Meanwhile, separate and equal streams of hydrogen are conducted through separate tubes containing in one of them a reservoir of arsenic trichloride heated to about 100° C. and in the other a body of zinc chloride dopant heated to about 360° C. From the heated tubes the arsenic trichloride and zinc chloride are carried by the hydrogen on through the tubes to the reaction tube. The separate streams of hydrogen carrying the vaporized $AsCl_3$ and zinc chloride conjoin with the hydrogen chloride-gallium reaction mixture in the fused silica reaction tube where a reaction occurs in which a single crystal film of p-type gallium arsenide is formed on the seed crystal of n-type gallium arsenide as an epitaxial layer which exhibits about $10^{18}$ carriers (holes) per cc. The seed crystal after 5 hours weighs 3.44 g.

X-ray diffraction patterns show that the deposited layer is single crystal in form and oriented in the same fashion as the substrate.

Point contact rectification tests show that a p-n junction exists at the region of the junction between the epitaxial layer and the seed crystal substrate.

Example 2

The same procedure outlined in Example 1 is repeated but phosphorus trichloride heated to about 60° C. is substituted for the arsenic trichloride. In this example, a seed crystal of n-type GaP weighing 1.45 g. and containing about $5.5 \times 10^{18}$ carriers/cc. of sulfur dispersed therein is used.

In the reaction tube, the vaporous hydrogen chloride-gallium reaction mixture, $PCl_3$, zinc dopant and hydrogen react to form p-type GaP which deposits from the vapor phase onto the seed crystal of n-type GaP. The reaction is allowed to proceed for 1.5 hours, after which the product is removed from the reaction tube, weighed and is found to have increased in weight by 0.01 g. The crystal upon X-ray examination is found to consist of an overgrowth of single crystal p-type GaP having the same crystal orientation as the n-type GaP substrate. The crystal exhibits rectification showing that a p-n junction exists at the boundary between the epitaxial overgrowth and the substrate.

Example 3

This example illustrates the formation of a product having an n-type InP overgrowth on a p-type GaAs substrate.

The apparatus and procedure outlined in Examples 1 and 2 are used and followed generally, except that the reservoir containing the III-B element, i.e., elemental indium also contains a quantity of an element to be used as the doping agent for the vapor-deposited compound. To the indium in the reservoir is added tin in the amount corresponding to 0.01% of the amount of indium, i.e., a sufficient quantity to yield $1 \times 10^{19}$ carriers/cc. in the deposited product. In a second tube leading to the reaction tube is a reservoir of phosphorus trichloride.

A seed crystal of gallium arsenide containing about $5.7 \times 10^{18}$ carriers/cc. of zinc dispersed therein to provide p-type conductivity, is placed in the reaction tube located in the furnace. The furnace is then heated to 900° C. and a stream of hydrogen directed through the reaction tube for about 20 minutes to remove any oxygen present.

The reservoir of elemental indium containing the tin is heated to 1000° C. and the contents are reacted with a stream of hydrogen bromide passing through the reservoir to the reaction tube. Simultaneously, the second tube containing the phosphorus trichloride is heated to about 60° C. in the presence of a stream of hydrogen. The vaporized phosphorus trichloride is also carried to the reaction tube wherein the HBr-indium reaction mixture reacts with the phosphorus trichloride and hydrogen in the presence of tin dopant to produce n-type indium phosphide which deposits from the vapor phase as a uniform layer upon the seed crystal of p-type gallium arsenide.

The product, upon examination shows an epitaxial layer of single crystal indium phosphide having the same crystal orientation as the gallium arsenide substrate and exhibits rectification indicating the existence of a p-n junction between the epitaxial layer and the substrate.

Example 4

This example illustrates the preparation of an indium phosphide substrate having deposited thereon an epitaxial overgrowth of aluminum antimonide.

The procedure described in the preceding example is repeated, except that the seed crystal used is p-type indium phosphide containing about $5.1 \times 10^{17}$ carriers/cc. of cadmium dispersed therein. The reservoir containing the III-B element, aluminum, also contains sufficient tin doping agent to dope the subsequently formed aluminum antimonide to a carrier concentration of about $1 \times 10^{20}$ carriers/cc. The V-B compound used in this example is antimony trichloride. The tube containing the reservoir of antimony trichloride is heated to 200° C. while passing a stream of hydrogen therethrough, while the aluminum and tin are heated to 700° C. in a stream of hydrogen iodide. These separate gaseous streams containing the vaporized reactants are then conducted to the reaction tube which is heated to 600° C. and contains the indium phosphide seed crystal. Here, the vaporized reactants intermix and aluminum antimonide containing the tin doping agent dispersed therein deposits from the vapor phase onto the indium phosphide seed crystal.

Again, X-ray diffraction patterns of the substrate crystal show that the deposited layer is single crystal in form and oriented in the same manner as the substrate.

Point contact rectification tests show the presence of a p-n junction as in preceding examples.

*Example 5*

This example illustrates the formation and deposition of an epitaxial film of n-type GaAs on n-type GaAs of high resistivity (semi-insulating) as the substrate when elemental arsenic is employed instead of an arsenic compound in the hydrogen mixture.

A polished seed crystal of n-type GaAs with a resistivity of $10^6$ ohm-centimeters is placed in a fused silica reaction tube located in a furnace. The GaAs seed crystal is placed on a silica support inside said tube. The reaction tube is heated to 700° C. and a stream of hydrogen is directed through the tube for 15 minutes to remove oxygen from the surface of the GaAs.

A stream of hydrogen chloride is then directed through a reservoir of elemental gallium maintained at about 800° C. thus vaporizing and reacting with the gallium which gaseous reaction mixture is then conducted through a heated tube from the reservoir to the reaction tube containing the GaAs seed crystal.

Meanwhile, a stream of hydrogen is conducted through a separate tube containing a body of elemental arsenic heated to 540° C. From this heated tube the arsenic is carried by the hydrogen on through the tube to the reaction tube. The stream of hydrogen carrying vaporized arsenic and the hydrogen chloride-gallium reaction mixture conjoin in the fused silica reaction tube where a reaction occurs between the gaseous hydrogen mixture and the hydrogen chloride-gallium reaction mixture in which a single crystal film of n-type gallium arsenide is formed on the seed crystal of n-type semi-insulating gallium arsenide as an epitaxial layer which exhibits about $10^{16}$ carriers (holes) per cc.

X-ray diffraction patterns of the product show that the deposited layer is single crystal in form and oriented in the same fashion as the substrate.

Placing the sample in a magnetic field of 3000 gauss with a current of 10 milliamperes through the sample, a Hall voltage of 0.1 volt is obtained, showing the utility of the film as a Hall generator.

*Example 6*

The same procedure outlined in Example 5 is repeated, but elemental red phosphorus heated to 450° is substituted for the elemental arsenic and hydrogen bromide is substituted for hydrogen chloride and 0.001% cadmium is added to the elemental gallium. In this example, a seed crystal of p-type GaP with a resistivity of $10^6$ ohm centimeters is employed. High resistivity GaP is obtained by incorporating therein compensating amounts (e.g., $10^{15}$ to $10^{17}$ atoms per cc.) of n- and/or p-type dopants. Suitable methods of doping include diffusion or melt doping.

In the reaction tube, the hydrogen bromide-gallium-cadmium reaction mixture, phosphorus, and hydrogen react to form p-type GaP which deposits from the vapor phase onto the seed crystal of p-type GaP. The reaction is allowed to proceed for 1.5 hours, after which the GaP-filmed product is removed from the reaction tube, weighed and the seed crystal is found to have increased in weight by 0.01 g. The crystal upon X-ray diffraction is found to consist of an overgrowth of single crystal p-type GaP having the same crystal orientation as the p-type GaP substrate. The crystal exhibits a large Hall voltage, similar to that recited in the preceding example.

*Example 7*

This example illustrates the formation of a product having an n-type InP overgrowth on a p-type GaAs substrate using elemental phosphorus instead of a phosphorus compound in the hydrogen stream.

The apparatus and procedure outlined in Example 3 is used and allowed, generally, except that the reservoir containing the V–B component contains a body of elemental red phosphorus.

A seed crystal of gallium arsenide containing about $5.7 \times 10^{18}$ carriers/cc. of zinc dispersed therein, to provide p-type conductivity, is placed in the reaction tube located in the furnace. The furnace is then heated to 900° C. and a stream of hydrogen directed through the reaction tube for about 20 minutes to remove any oxygen present.

The reservoir of indium containing the tin is heated to 1000° C. and the components are volatilized and reacted with a stream of hydrogen bromide passing through the reservoir to the reaction tube. Simultaneously, the second tube containing the elemental red phosphorus is heated to about 500° C. in the presence of a stream of hydrogen. The vaporized phosphorus is also carried to the reaction tube wherein the hydrogen bromide-indium reaction mixture combines with the gaseous mixture of phosphorus and hydrogen in the presence of the tin dopant to deposit n-type indium phosphide from the vapor phase as a uniform layer upon the seed crystal of p-type gallium arsenide.

The product, upon examination shows an epitaxial layer of single crystal indium phosphide having the same crystal orientation as the gallium arsenide substrate, and exhibits rectification indicating the existence of a p-n junction between the epitaxial layer and the substrate.

*Example 8*

This example illustrates the preparation of an indium phosphide substrate having deposited thereon epitaxial overgrowth of aluminum arsenide.

The procedure described in the preceding example is repeated except that the seed crystal used is p-type indium phosphide containing about $5.1 \times 10^{17}$ carriers/cc. of cadmium dispersed therein. The reservoir containing the III–B i.e., elemental aluminum, also contains sufficient tin doping agent to dope the subsequently formed aluminum arsenide to a carrier concentration of about $1 \times 10^{20}$ carriers/cc. The V–B element used in this example is elemental arsenic contained in a tube heated to 540° C. while passing a stream of hydrogen therethrough, while the aluminum and tin are heated to 700° C. in a stream of hydrogen bromide. These separate streams containing the vaporized reactants are then conducted to the reaction tube which is heated to 600° C. and contains the indium phosphide seed crystal. Here, the vaporized reactants intermix and react and aluminum arsenide containing the tin doping agent dispersed therein deposits on the indium phosphide seed crystal.

Again X-ray diffraction patterns of the substrate crystal show that the deposited layer is single crystal in form and oriented in the same manner as the substrate.

Point contact rectification tests show the presence of a p-n junction as in preceding examples.

*Example 9*

This example illustrates the formation and deposition of an epitaxial film of p-type boron phosphide on n-type aluminum phosphide as the substrate.

A polished seed crystal of n-type AlP weighing 2.98 g. and containing $5.8 \times 10^{18}$ carriers/cc. of tellurium dispersed therein is placed in a fused silica reaction tube located in a furnace. The AlP seed crystal is placed on a graphite support inside said tube. The reaction tube is heated to 1200° C. and a stream of hydrogen is directed through the tube for 15 minutes to remove oxygen from the surface of the AlP.

A stream of hydrogen chloride is then directed through a reservoir of powdered elemental boron maintained at about 1100° C. thus reacting with and vaporizing the boron which gaseous reaction product is then carried through a heated tube from the reservoir to the reaction tube containing the AlP seed crystal.

Meanwhile, separate and equal streams of hydrogen are conducted through separate tubes containing in one of them a body of elemental red phosphorus heated to 500° C. and in the other a body of zinc cloride heated to 360° C. From these heated tubes the phosphorus and zinc chloride are carried by the hydrogen on through the tubes to the reaction tube.

The separate streams of hydrogen carrying the vaporized phosphorus and zinc chloride conjoin with the hydrogen chloride-boron reaction mixture in the fused silica reaction tube where a reaction occurs in which a single crystal film of p-type boron phosphide is formed on the seed crystal of n-type aluminum phosphide forming thereon an epitaxial layer which exhibits about $10^{18}$ carriers (holes) per cc. The seed crystal after 5 hours weighs 3.54 g.

X-ray diffraction patterns of the product show that the deposited layer is single crystal in form and oriented in the same fashion as the substrate.

Rectification tests show that a p-n junction exists at the region of the junction between the epitaxial layer and the seed crystal substrate.

*Example 10*

This example illustrates the procedure for producing a product having a plurality of layers of different electrical properties.

The procedure here is similar to that followed in the preceding examples, and the apparatus is the same.

The reservoir containing the III–B element, gallium, is heated to 800° C. in a stream of hydrogen chloride while the tube containing a body of elemental arsenic is heated to about 540° C. in a stream of hydrogen and a separate tube containing $ZnCl_2$ is heated to about 360° C. in a stream of hydrogen. These separate streams containing the vaporized reactants are conducted to the reaction tube which contains a seed crystal of polished elemental germanium doped to a carrier concentration of about $5.8 \times 10^{18}$ atoms/cc. of phosphorus. In the reaction tube, previously flushed with hydrogen and heated to 700° C., the vaporized reactants combine and react to form p-type gallium arsenide which deposits from the vapor phase onto the n-type germanium seed crystal. The reaction proceeds for about 15 minutes, after which the flow of the separate streams of hydrogen and hydrogen chloride are discontinued temporarily. A fresh supply of arsenic doped with a trace amount of tellurium is added to replace the original arsenic source.

After the fresh source of arsenic is charged to the system, the hydrogen chloride supply is again opened to stream through the elemental gallium reservoir, again heated to 800° C. and the arsenic-tellurium source heated to 540° C. Again, the vaporized reactants are carried to the reaction tube heated to 700° C. In the reaction tube n-type gallium arsenide deposits from the gaseous reaction mixture upon the p-type gallium arsenide layer previously deposited on the n-type germanium seed crystal.

After the reaction has proceeded to completion, the product upon examination is found to consist of a substrate of n-type germanium, having successive layers of p-type gallium arsenide and n-type gallium arsenide. These deposited layers exhibit the same X-ray orientation pattern as the single crystal germanium substrate indicating the same orientation and single crystal form characteristic of epitaxial films.

The product further exhibits rectification showing the presence of an n-p junction between the n-type gallium arsenide and the p-type gallium arsenide and a p-n junction between the latter compound and the n-type germanium substrate. When this example is repeated substituting silicon for germanium, substantially similar results occur.

By this method any number and combination of epitaxial and non-epitaxial layers may be deposited one upon the other.

An alternative to the foregoing procedure is to connect a fourth tube containing a second III–B element reservoir and hydrogen halide supply to the reaction tube at a point near the junction of the tube containing the first III–B element reservoir and the tube containing the V–B element reactant. The fourth tube is closed off during the first phase of the process, i.e., while the first epitaxial layer is being formed, and thereafter opened to the system while closing off the tube containing the first III–B element.

A still further modification of this invention is to use a mixture of Group III–B elements in one or more reservoirs and/or a mixture of the Group V–B elements in another reservoir(s) and proceed in the usual manner. Illustrations of this modification are shown in the following three examples:

*Example 11*

A polished seed crystal of p-type gallium phosphide containing $5.5 \times 10^{18}$ carriers/cc. of zinc dispersed therein is placed in the fused silica reaction tube. The tube is heated to 900° C. and a stream of hydrogen is directed through the tube for 15 minutes to remove any oxygen present.

A mixture of elemental gallium and elemental indium is placed in the reservoir for the III–B element as described in preceding examples, and a body of elemental phosphorus is placed in another tube connected to the reaction tube. The phosphorus contains about 0.1% tellurium.

A stream of hydrogen bromide is then directed through the reservoir containing the mixture of gallium and indium and heated to about 1000° C., while a stream of hydrogen is then passed over the phosphorus in the other tube heated to about 500° C. The vaporized components in both tubes are then carried to the reaction tube containing the gallium phosphide seed crystal. In the reaction tube heated to 900° C., the vaporized hydrogen bromide-gallium-indium reaction mixture combines and reacts with the vaporized hydrogen-phosphorous and tellurium mixture to form a gallium indium phosphide mixed binary crystal which deposits from the vapor phase in single crystal form as an epitaxial film on said p-type gallium phosphide seed crystal. The n-type mixed crystal layer is shown by X-ray diffraction patterns to have the same crystal orientation as the seed crystal, characteristic of epitaxial layers and upon analysis is found to have the formula $Ga_{0.17}In_{0.29}P$.

*Example 12*

This example illustrates the preparation of an epitaxial film of a three component mixed binary crystal of III–V elements on a gallium arsenide substrate.

A seed crystal of gallium arsenide containing $5.8 \times 10^{19}$ carriers/cc. of zinc is placed in the fused silica reaction tube which is flushed with hydrogen to remove oxygen. A quantity of gallium is placed in the reservoir for the III–B element, and a mixture of elemental arsenic and red phosphorus containing about 0.1% of tellurium is placed in a second tube connected to the reaction tube. (A variation of this arrangement is to use three tubes connected to the reaction tube, one tube containing the reservoir for III–B element and the remaining two tubes each containing a separate V–B element.)

The gallium reservoir is then heated to about 800° C. and a stream of hydrogen iodide passed therethrough, while the tube containing the V–B elements is heated to about 500–525° C., while a hydrogen stream is directed through it. The vaporized components in both tubes are conducted to the reaction tube containing the seed crystal. In the reaction tube, heated to 700° C., the hydrogen iodide-gallium reaction mixture combines with and reacts with the vaporized arsenic-phosphorus hydrogen mixture containing the tellurium dopant to form a mixed binary compound, which upon analysis is found to have the formula $GaAs_{0.1}P_{0.9}$, which deposits from the vapor phase onto the gallium arsenide seed crystal.

Analysis of the filmed product shows uniform crystal orientation in both layer and substrate indicating epitaxial connection of the layer to the substrate. This product likewise exhibits rectification, showing the existence of a p-n junction between the tellurim doped n-type epitaxial layer and the zinc doped p-type gallium arsenide seed crystal.

By varying the flow rates of hydrogen halide through the gallium reservoir and hydrogen through the respective phosphorus and arsenic reservoirs according to the aforementioned variation of this example, epitaxial films of ternary compositions over the whole range of $GaP_xAs_{1-x}$ are obtained, where X has a value less than 1 and greater than zero.

In accordance with the present embodiment of this invention, epitaxial films of ternary compositions of III–B—V–B elements may be prepared merely by reacting a hydrogen halide reaction product of one Group III–B element with two Group V–B elements admixed with hydrogen, or vice-versa, i.e., by reacting two Group III–B elements reacted with a hydrogen halide with one Group V–B element in the presence of hydrogen. Thus, epitaxial films of these ternary compositions may be formed by combining a sum of three Group III–B elements and Group V–B elements in any combination in the presence of hydrogen and hydrogen halide.

*Example 13*

This example illustrates the preparation of epitaxial films of quaternary mixed binary crystals of III-V elements.

A mixture of elemental gallium and elemental indium is placed in one reservoir and a mixture of arsenic and phosphorus containing a small amount of tellurium is placed in a second reservoir. Both reservoirs are connected to a quartz reaction tube containing a polished seed crystal of zinc-dope GaAs. (This arrangement may be varied a number of ways, e.g., by placing each reactant in separate reservoirs along a common conduit to the reaction tube or each reservoir may have its own conduit to the reaction tube.)

A stream of hydrogen chloride is passed through the reservoir containing the gallium and indium which is heated to about 1000° C., and the reservoir containing the tellurium-doped phosphorus-arsenic mixture is heated to about 500–525° C. while a hydrogen stream is directed through it. The vaporized components in both reservoirs are then conducted through quartz tubes to the reaction tube which is heated to about 900° C. The vaporized components in both reservoirs are then conducted through quartz tubes to the reaction tube which is heated to about 900° C. The separate streams carrying the reactants converge in the reaction tube where the hydrogen chloride-gallium and indium reaction mixture is reacted with the hydrogen-phosphorus and arsenic mixture containing tellurium for about 1 hour to form a four-component mixed binary crystal having the formula $$Ga_{0.7}In_{0.3}As_{0.1}P_{0.9}$$

which deposits as an epitaxial film on the GaAs seed crystal.

This product, having a gallium arsenide substrate of p-type conductivity and an epitaxial film of n-type conductivity, exhibits rectification suitable for use in semiconductor devices.

Similarly, other four-component mixed binary crystals of III-V compounds may be deposited as epitaxial films merely by combining a reaction mixture of hydrogen halide and at least one Group III–B element with a mixture of hydrogen and at least one Group V–B element, provided that the sum of the III–B elements and the V–B elements reacted equals four. That is, one, two or three Group III–B elements reacted with a hydrogen halide may be reacted with, respectively, three, two or one Group V–B elements in the presence of hydrogen to produce epitaxial films of the quaternary compositions of III-V elements of this embodiment of the present invention.

*Example 14*

This example illustrates the deposition of an epitaxial film of indium arsenide onto a substrate of a I–VII compound having the cubic zinc blende structure typified by single crystal copper iodide.

A polished seed crystal of single crystal copper iodide having approximate dimensions of 2 mm. thick, 15 mm. wide and 20 mm. long is placed in a fused silica reaction tube located in furnace. The reactor is heated to 550° C. and a stream of a mixture of hydrogen and hydrogen iodide is directed through the tube for 15 minutes to remove oxygen from the system.

A stream of hydrogen iodide is then directed through a reservoir of elemental indium containing about 0.0001% tin and maintained at about 650° C. thus vaporizing and reacting with the indium and tin which are then conducted through a heated tube containing the copper iodide seed crystal.

Meanwhile, a separate and equal stream of hydrogen is conducted through a separate tube containing a body of elemental arsenic heated to 540° C. From this heated tube the vaporized arsenic is carried by the hydrogen on through the tube to the reaction tube.

The separate streams of the hydrogen iodide-indium reaction mixture and arsenic mixed with hydrogen conjoin in the fused silica reaction tube where a reaction occurs in which a single crystal form of n-type indium arsenide is formed as a film-deposit on the single crystal copper iodide substrate.

X-ray diffraction patterns of the film deposit and substrate show that the deposited layer is single crystal in form and has the same lattice orientation as the substrate, hence, the indium arsenide forms an epitaxial film on the single crystal copper iodide substrate.

The Hall coefficient of the film of InAs on the copper iodide substrate is found to be $-300$ cm.$^3$/coulomb, making it of utility in magnetic Hall devices. The film also exhibits photoconduction.

While the foregoing example has illustrated the use of single crystal I-VII compounds using copper iodide as the substrate, in a similar manner the fluorides, chlorides, bromides and iodides of copper, silver and gold having the zinc blende structure are likewise used as substrates for epitaxial overgrowths of III-V compounds. Similarly, single crystal I-VII compounds having the cubic sodium chloride type structure may be used as substrate for epitaxial growth of III-V compounds. In this manner, the fluorides, chlorides, bromides and iodides of sodium, lithium, potassium, rubidium and cesium are used as substrates. Preferred I-VII compounds include copper fluoride, copper chloride, copper bromide, copper iodide, and silver iodide.

*Example 15*

This example illustrates the deposition of an epitaxial film of gallium arsenide onto a substrate of a II-VI compound having the cubic zinc blende structure typified by single crystal zinc selenide.

A polished seed crystal of single crystal n-type zinc selenide (doped with boron) having approximate dimensions 2 mm. thick, 10 mm. wide and 15 mm. long is placed in a fused silica reaction tube located in a furnace. The reaction tube is heated to 700° C. and a stream of hydrogen is directed through the tube for 15 minutes to remove oxygen therefrom.

A stream of hydrogen chloride is then directed through a reservoir of elemental gallium maintained at 800° C. thus reacting with and vaporizing the gallium which is then conducted through a heated tube from the reservoir to the reaction tube containing the zinc selenide seed crystal.

Meanwhile, separate and equal streams of hydrogen are conducted through two separate tubes containing, respectively, a body of elemental arsenic heated to 540° C. and a body of zinc chloride heated to 360° C. From these heated tubes the arsenic and zinc chloride are carried by the hydrogen on through the tubes to the reaction tube.

The separate streams of the hydrogen chloride-gallium reaction mixture, the arsenic and $ZnCl_2$-hydrogen mixtures conjoin in the fused silica reaction tube where a reaction occurs in which a single crystal form of p-type gallium arsenide is formed as a film-deposit on the single crystal n-type zinc selenide substrate.

X-ray diffraction patterns of the film deposit and substrate show that the deposited layer is single crystal in form and has the same lattice orientation as the substrate, hence, the gallium arsenide forms an epitaxial film on the single crystal zinc selenide substrate.

While the foregoing example has illustrated the use of single crystal II-VI compounds using zinc selenide as the substrate, in a similar manner the sulfides, selenides and tellurides of beryllium, zinc, cadmium, and mercury are likewise used as substrates for epitaxial overgrowths of III-V compounds. Similarly, single crystal II-VI compounds having the cubic sodium chloride type structure may be used as substrates for epitaxial growth of the III-V compounds. In this manner the oxides, sulfides, selenides and tellurides of magnesium, calcium, strontium and barium, as well as cadmium oxide, are used as substrates. Preferred II-VI compounds include zinc sulfide, zinc selenide, zinc telluride, cadmium sulfide, cadmium selenide, cadmium telluride, mercury sulfide, mercury selenide, mercury telluride, beryllium sulfide, beryllium selenide and beryllium telluride.

It will be seen that the products obtained according to the present invention have a variety of applications. For example, in electronic devices where it is desirable to have a substantially inert non-conducting base for III-V semiconductors, the product described in Example 14 is highly suitable. Where it is desired to obtain semiconductor components having semiconducting properties in the base material as well as in the epitaxial film, those products described in Examples 1–13 and Example 15 above are of particular value.

Electronic devices may also be fabricated wherin a semi-conducting component comprising an epitaxial film of III-V compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such as Al-Zn, SbCoMn, BTi and $Cr_2Ti$.

The present invention is useful for producing III-V compounds, per se, which are of utility as semiconductor components in electronic applications. For example, the III-V compounds produced herein are useful as source materials for the preparation of epitaxial films by the hydrogen halide transport method as described in copending U.S. application Serial No. 176,867, filed February 26, 1962 which is a continuation-in-part of U.S. Serial No. 92,872 filed March 2, 1961, and now abandoned. Also, the III-V compounds produced herein can be formed into large single crystals by conventional methods such as the Czochralski method or the Bridgman method to give materials having direct utility in electric applications.

The III-V compounds as produced according to the present method are usually a mixture of single crystal and polycrystalline material which may be compacted, for example, by hot-pressing techniques into shaped bodies for ultimate use.

*Example 16*

This example illustrates the production of III-V compounds, per se, as typified by GaAs.

A stream of hydrogen chloride was directed through a fused silica reservoir of elemental gallium maintained at about 780° C. thus reacting with and vaporizing the gallium, which gaseous reaction product was then conducted through a heated tube from the reservoir to a fused silica and reaction tube heated to 650° C.

Meanwhile, a separate stream of hydrogen was conducted through a tube containing a reservoir of arsenic trichloride heated to about 64° C. From the heated tube the arsenic trichloride was carried by the hydrogen on through the tube to the reaction tube. The separate stream of hydrogen carrying the vaporized $AsCl_3$ conjoined with the hydrogen chloride-gallium reaction mixture in the fused silica reaction tube where a reaction occurred in which crystalline gallium arsenide was formed on the walls of the reaction tube from which it was readily removed, e.g., by scraping.

The resistivity of a single crystal portion of the deposit was found to be 0.067 ohm-centimeters and it exhibited n-type conduction.

Various other modifications of the instant invention will be apparent to those skilled in the art without departing from the spirit and scope thereof.

I claim:

1. Process for the production and deposition of epitaxial films comprised of compounds selected from the group consisting of the nitrides, phosphides, arsenides and antimonides of boron, aluminum, gallium, indium and mixtures thereof, onto a substrate material the crystal lattice spacing of which is within about 40% of that of said compounds and being selected from the class consisting of I-VII, II-VI and III-V compounds, germanium and silicon, which comprises combining the vapor phase (1) a gaseous mixture formed by the reaction of hydrogen halide and a Group III element and (2) a gaseous mixture of hydrogen and a substance selected from the group consisting of a Group V element and a volatile Group V compound while excluding oxidizing gases, and contacting the resulting reaction mixture with said substrate at a temperature within the range of from 135° C. to 1500° C. to deposit a single crystal form of at least one III-V compound as an epitaxial film on said substrate.

2. Process for the production and deposition of an epitaxial film comprised of gallium arsenide which comprises combining in the vapor phase (1) a gaseous mixture formed by the reaction of hydrogen chloride and elemental gallium and (2) a gaseous mixture of hydrogen and elemental arsenic while excluding oxidizing gases, and contacting the resulting reaction mixture with a substrate also comprised of gallium arsenide at a temperature within the range of from 600° C. to 1200° C. to deposit single crystal gallium arsenide as an epitaxial film on said substrate.

3. Process for the production and deposition of epitaxial films comprised of compounds having modified electrical conductivity and being selected from the group consisting of the nitrides, phosphides, arsenides and antimonides of boron, aluminum, gallium, indium, and mixtures thereof, onto a substrate material the crystal lattice spacing of which is within about 40% of that of said compounds and being selected from the class consisting of I-VII, II-VI and III-V compounds, germanium and silicon, which comprises combining in the vapor phase (1) a gaseous mixture formed by the reaction of hydrogen halide and a Group III element, (2) a gaseous mixture of hydrogen and a substance selected from the group consisting of a Group V element and a volatile Group V compound, and (3) a small amount of a doping agent while excluding oxidizing gases, and contacting the resulting reaction mixture with said substrate at a temperature within the range of from 135° C. to 1500° C. to deposit a single crystal form of at least one III-V compound as an epitaxial film having one conductivity type on said substrate having a different conductivity type.

4. Process according to claim 3 wherein said doping agent is selected from the group consisting of elements and compounds in Groups II and VI of the periodic system.

5. Process according to claim 4 wherein said hydrogen chloride, said Group III element is gallium, said Group V element is arsenic, said doping agent is a Group II element and said substrate is n-type gallium arsenide.

6. Process for the production and deposition of epitaxial films comprised of mixed binary crystals of compounds selected from the group consisting of the nitrides, phosphides, arsenides and antimonides of boron, aluminum, gallium, indium and mixtures thereof, onto a substrate material the crystal lattice spacing of which is within about 40% of that of said compounds and being selected from the group consisting of I-VII, II-VI and III-V compounds, germanium and silicon which comprises combining in the vapor phase (1) a gaseous mixture formed by the reaction of hydrogen halide and at least one Group III element and (2) a gaseous mixture comprised of hydrogen and at least one substance selected from the group consisting of Group V elements and volatile Group V compounds, provided that the sum of the Groups III and V components in said vapor phase is greater than two while excluding oxidizing gases, and contacting the resulting reaction mixture with said substrate at a temperature within the range of from 135° C. to 1500° C. to deposit a single crystal form of mixed binary crystal compounds as an epitaxial film on said substrate.

7. Process according to claim 6 wherein said epitaxial film and said substrate contain a small amount of doping agent to produce modified electrical conductivity.

8. Process for the production and deposition of a plurality of epitaxial layers comprised of compounds selected from the group consisting of the nitrides, phosphides, arsenides and antimonides of boron, aluminum, gallium, indium, and mixtures thereof, onto a substrate material the crystal lattice spacing of which is within about 40% of that of said compounds and being selected from the group consisting of I-VII, II-VI and III-V compounds, germanium and silicon, which comprises combining in the vapor phase (1) a gaseous mixture formed by the reaction of hydrogen halide and at least one Group III element, and (2) a gaseous mixture of hydrogen and at least one substance selected from the group consisting of a Group V element and a volatile Group V compound while excluding oxidizing gases, and contacting the resulting reaction mixture with said substrate at a temperature within the range of from 135° C. to 1500° C. to deposit a single crystal form of at least one III-V compound as an epitaxial film on said substrate, and repeating this procedure as many times as the number of epitaxial layers desired, but providing modified electrical properties in successive layers by inclusion therein of small amount of doping agents.

9. Process for the production of crystalline III-V compounds selected from the group consisting of the nitrides, phosphides, arsenides and antimonides of boron, aluminum, gallium, indium, and mixtures thereof, which comprises combining in the vapor phase (1) a gaseous mixture formed by the reaction of hydrogen halide and a Group III element and (2) a gaseous mixture of hydrogen and a substance selected from the group consisting of a Group V element and a volatile Group V compound while excluding oxidizing gases, to obtain a crystalline form of at least one of said III-V compounds.

10. Process for the production of crystalline gallium arsenide which comprises combining in the vapor phase (1) a gaseous mixture formed by the reaction of hydrogen chloride and elemental gallium and (2) a gaseous mixture of hydrogen and elemental arsenic while excluding oxidizing gases, to obtain crystalline gallium arsenide.

11. Process for the production of mixed binary crystals of crystalline III-V compounds selected from the group consisting of the nitrides, phosphides, arsenides and antimonides of boron, aluminum, gallium, indium and mixtures thereof, which comprises combining in the vapor phase (1) a gaseous mixture formed by the reaction of hydrogen halide and at least one Group III element and (2) a gaseous mixture comprised of hydrogen and at least one substance selected from the group consisting of Group V elements and volatile Group V compounds while excluding oxidizing gases, provided that the sum of the Groups III and V components in said vapor phase is greater than two, to obtain a crystalline form of said mixed binary crystal compounds.

References Cited by the Examiner

UNITED STATES PATENTS

| | | | |
|---|---|---|---|
| 2,692,839 | 10/1954 | Christensen et al. | 148—1.5 |
| 2,798,989 | 7/1957 | Welker | 148—1.5 |
| 2,858,275 | 10/1958 | Folberth | 148—1.5 X |
| 2,974,064 | 5/1961 | Williams et al. | 252—62.3 |

FOREIGN PATENTS

| | | |
|---|---|---|
| 1,029,941 | 5/1958 | Germany. |
| 1,193,194 | 10/1959 | France. |

OTHER REFERENCES

Anderson: "Germanium-Gallium Arsenide Heterojunctions" IBM Journal of Research and Development, vol. 4, No. 3, July 1960, pp. 283–287.

Antell et al.: "Preparation of Crystals of InAs, InP, GaAs, and GaP, by Vapor Phase Reaction," Journal of the Electrochemical Society, vol. 106, June 1959, pp 509–510.

Lyons et al.: "Forming a Compound PN Junction," IBM Technical Disclosure Bulletin, vol. 3 No. 8, January 1961, page 3.

Marinace: "Vapor Growth of InSb Crystals by an Iodine Reaction," IBM Technical Disclosure Bulletin, vol. 3, No. 8 January 1961, page 33.

Holonyak et al.: Article in AIME Publication of Metallurgy of Semiconductor Materials, Aug. 30-Sept. 1, 1961, vol. 15, Interscience Publishers, pp. 49–59.

DAVID L. RECK, *Primary Examiner.*

RAY K. WINDHAM, *Examiner.*

UNITED STATES PATENT OFFICE
CERTIFICATE OF CORRECTION

Patent No. 3,218,205                          November 16, 1965

Robert A. Ruehrwein

It is hereby certified that error appears in the above numbered patent requiring correction and that the said Letters Patent should read as corrected below.

Column 3, line 73, for "$Ga_x In_{1-x} P$" read -- $GaAs_x(P_y N_{1-y})_{1-x}$ --; column 12, line 31, for "reservior" read -- reservoir --; column 13, line 58, for "wherin" read -- wherein --; column 14, line 3, for "electric" read -- electronic --; line 18, for "and reaction tube" read -- reaction tube --; line 45, for "combining the vapor phase" read -- combining in the vapor phase --; column 15, lines 17 and 18, for "said hydrogen chloride" read -- said hydrogen halide is hydrogen chloride --.

Signed and sealed this 1st day of August 1967.

(SEAL)
Attest:

EDWARD M. FLETCHER, JR.                    EDWARD J. BRENNER
Attesting Officer                              Commissioner of Patents